US008527745B2

(12) United States Patent
Watkins et al.

(10) Patent No.: US 8,527,745 B2
(45) Date of Patent: Sep. 3, 2013

(54) INPUT/OUTPUT DEVICE INCLUDING A HOST INTERFACE FOR PROCESSING FUNCTION LEVEL RESET REQUESTS AND UPDATING A TIMER VALUE CORRESPONDING TO A TIME UNTIL APPLICATION HARDWARE REGISTERS ASSOCIATED WITH THE FUNCTION LEVEL RESET REQUESTS ARE AVAILABLE

(75) Inventors: John E. Watkins, Sunnyvale, CA (US); Elisa Rodrigues, Union City, CA (US)

(73) Assignee: Oracle America, Inc., Redwood City, CA (US)

( * ) Notice: Subject to any disclaimer, the term of this patent is extended or adjusted under 35 U.S.C. 154(b) by 661 days.

(21) Appl. No.: 12/632,415

(22) Filed: Dec. 7, 2009

(65) Prior Publication Data
US 2011/0138161 A1    Jun. 9, 2011

(51) Int. Cl.
G06F 15/177    (2006.01)
G06F 9/00    (2006.01)
G06F 11/00    (2006.01)

(52) U.S. Cl.
USPC .................................. 713/2; 714/23; 714/24

(58) Field of Classification Search
USPC .......................................... 714/23, 24; 713/2
See application file for complete search history.

(56) References Cited

U.S. PATENT DOCUMENTS

| | | | | |
|---|---|---|---|---|
| 6,073,253 | A * | 6/2000 | Nordstrom et al. | 714/25 |
| 6,252,872 | B1 * | 6/2001 | Tzeng | 370/360 |
| 2004/0167996 | A1 | 8/2004 | Takamura | |
| 2004/0221036 | A1 * | 11/2004 | Smith | 709/225 |
| 2006/0242332 | A1 * | 10/2006 | Johnsen et al. | 710/22 |
| 2007/0240018 | A1 * | 10/2007 | Nalawadi et al. | 714/23 |
| 2008/0005297 | A1 * | 1/2008 | Kjos et al. | 709/223 |
| 2011/0029710 | A1 * | 2/2011 | Matthews et al. | 710/311 |

OTHER PUBLICATIONS

"PCI Express Base Specification Revision 2.0"; PCI-SIG; Dec. 20, 2006, pp. 381-384.
U.S. Appl. No. 12/256,250, entitled "Mechanism for Performing Function Level Reset in an I/O Device", filed Oct. 22, 2008.

* cited by examiner

*Primary Examiner* — Thomas Lee
*Assistant Examiner* — Terrell Johnson
(74) *Attorney, Agent, or Firm* — Meyertons, Hood, Kivlin, Kowert & Goetzel, P.C.; Stephen J. Curran

(57) ABSTRACT

An I/O device includes a host interface configured to process function level reset (FLR) requests in a specified amount of time. The host interface includes a control unit and groups of configuration space registers, each group corresponding to a function. The host interface also includes application availability registers, each associated with a respective function, and which may indicate whether application hardware within the respective function is available for access by a corresponding application device driver. The I/O device also includes application hardware resources associated with a respective function. In response to receiving an FLR request of a particular function, the control unit may cause the associated application availability register to indicate that the application hardware within the particular function is not available to the driver. The control unit may reset the corresponding configuration space registers within a predetermined amount of time and reset the associated application hardware resources.

18 Claims, 3 Drawing Sheets

INPUT/OUTPUT DEVICE INCLUDING A HOST INTERFACE FOR PROCESSING FUNCTION LEVEL RESET REQUESTS AND UPDATING A TIMER VALUE CORRESPONDING TO A TIME UNTIL APPLICATION HARDWARE REGISTERS ASSOCIATED WITH THE FUNCTION LEVEL RESET REQUESTS ARE AVAILABLE

BACKGROUND OF THE INVENTION

1. Field of the Invention

This invention relates to computer systems and, more particularly, to shared input/output (I/O) resources.

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor or processing module typically does not use that much I/O bandwidth. Accordingly, in an effort to increase hardware resource utilization, sharing of I/O hardware resources may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with virtualizing and sharing of some hardware resources. For example, an I/O device that implements a PCIe interface uses the notion of a function. Functions may be used to access respective hardware resources. However, for a variety of reasons, a function and its resources may need to be reset or reclaimed by the system software without perturbing the operation of any other function or process. The function level reset process can be quite complex, particularly as the number of functions increases, and/or the application hardware within the device increases in both complexity and numbers. Accordingly, meeting the function level reset timing constraints imposed by the various communication standards can be difficult.

SUMMARY

Various embodiments of an I/O device including a host interface configured to process function level reset requests in a specified amount of time are disclosed. The I/O device also includes a plurality of application hardware resources that are coupled to the host interface. The host interface may provide one or more I/O connections to one or more processing units via respective corresponding communication links. The host interface includes a control unit and a plurality of groups of configuration space registers. Each group of configuration space registers may correspond to one of several functions. Each function may include one or more application hardware registers, and at least one of the application hardware registers may be associated with a respective application hardware resource. The host interface also includes a plurality of application availability registers. Each application availability register may be associated with a respective function and may be configured to indicate whether the application hardware registers within a respective function are available for general access by a corresponding software driver such as an application device driver, for example. In response to receiving a request for a function level reset (FLR) of a particular function, the control unit may be configured to cause the associated application availability register to indicate that the application hardware registers within the particular function are not available to the driver. In addition, the control unit may reset the corresponding group of configuration space registers within a predetermined amount of time. Further, the control unit may reset the associated application hardware resources after resetting the configuration space registers, for example.

Figure 1:
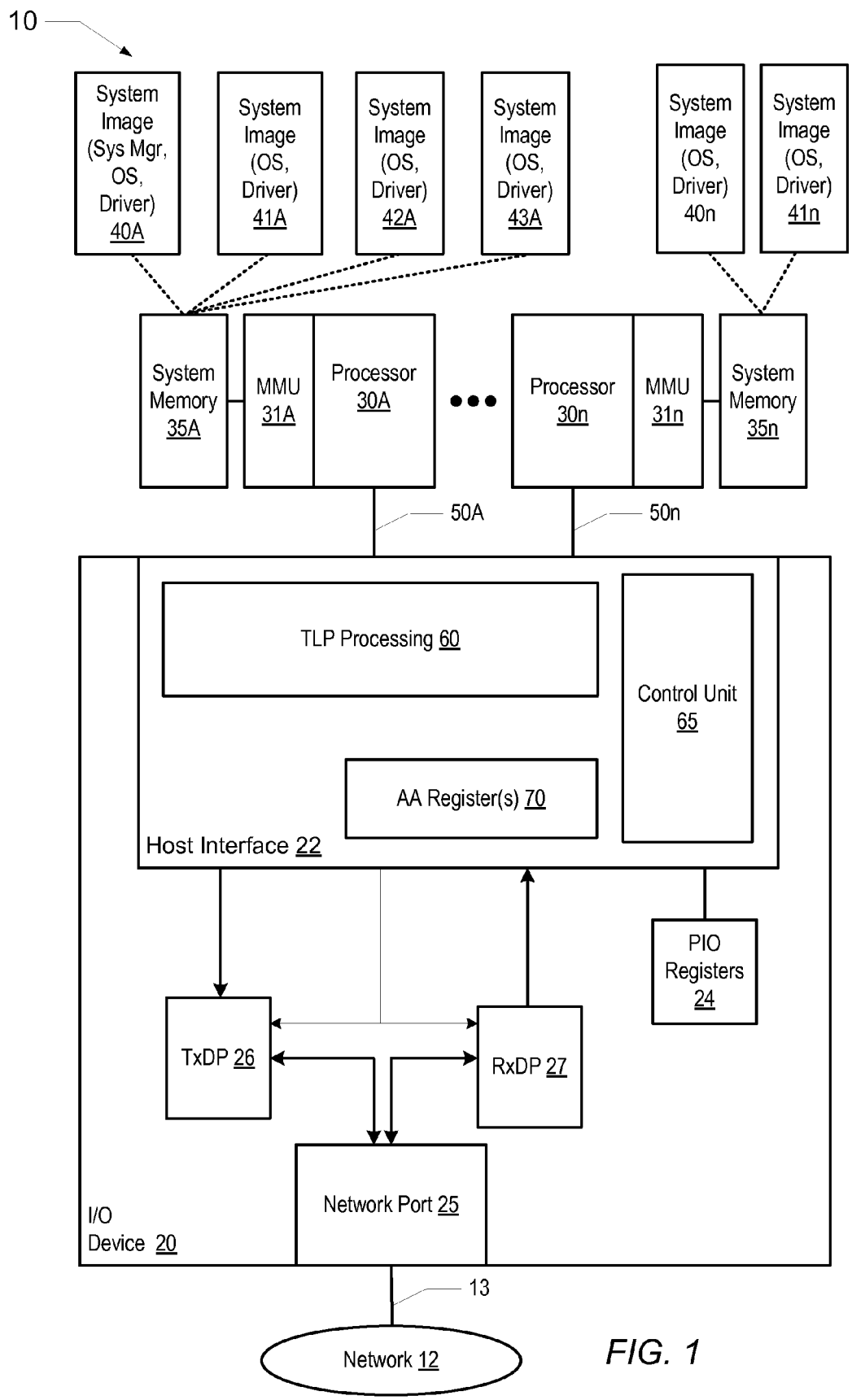
FIG. 1 is a block diagram of one embodiment of a computer system including a shared I/O device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, sharing of I/O hardware resources may be desirable in some systems. Thus, I/O standards have been introduced. However, there are issues with virtualizing and sharing of hardware resources. More particularly, one issue is the data and resources of each process must be protected from access by any other process. Another issue is that each process should have the perception that it is the sole user of the hardware resource. In addition, the OS and/or each process running on a given host processor may issue a function level reset (FLR) to one or more functions at any time to the I/O device. Thus, multiple functions may be reset concurrently and in a non-blocking fashion. However, from the perspective of the issuing entity each FLR must be completed within a specified amount of time. Thus, as described below, a shared I/O device may include a mechanism to partition the FLR logic such that the FLR issuing entity may attempt another access to the device through the corresponding driver after the specified time has elapsed even if the hardware resources defined by the function may not be completely reset.

Turning now to FIG. 1, a block diagram of one embodiment of a computer system 10 including an I/O device 20 connected to a network 12 is shown. Computer system 10 includes a plurality of processors designated 30A and 30n, where n may be representative of any whole number. As shown, the processors 30A and 30n are coupled to the I/O device 20 via respective communication links 50A and 50n. The I/O device 20 is coupled to a network 12. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and policy for caching of a particular data type. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A-43A may be stored within system memory 35A, as denoted by the dotted lines. Each of the system images may be representative of an instance of system software that is running on a given CPU within processor 30A. For example, the system image may include a system manager instance, an operating system instance, a device driver instance, as well as any other system level software executing on a processing unit. In addition, there may be several instances of an application device driver executing on a given CPU. For example, as described in greater detail below, a CPU may be running several processes, each requiring I/O hardware resources within the I/O device 20. In one embodiment, each of those processes may have its own application device driver instance that may be used to discover and access the respective hardware resources that have been assigned to each respective process.

In addition, as shown the I/O device 20 includes a transmit data path designated TxDP 26 and a receive datapath designated RxDP 27. In various embodiments, the RxDP 27 may include filtering and classification, and scheduling functionality, among others for transactions received from the network 12, while the TxDP 26 circuits may include arbitration and scheduling functionality for transactions going out to the network 12. It is noted that I/O device 20 may also include a variety of other circuits that have been omitted here for simplicity. For example, in various embodiments, I/O device 20 may include, a bus interface for connection to a service processor (not shown).

In the illustrated embodiment, the I/O device 20 includes a network port 25 that is coupled to the network 12 via a network link. 13. The network port 25 may provide a connection to the network 12 using a network protocol. In various embodiments, the network 12 may use any of a variety of frame-based protocols such as the Ethernet protocol. As such, in one embodiment the network connection may be a 10-Gigabit Ethernet (10GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

The I/O device 20 also includes a host interface 22 that is coupled to PIO registers 24. As shown, the host interface 22 includes a transaction layer packet (TLP) processing unit 60, a host interface control unit 65 and application availability (AA) register 70. In one embodiment, the host interface 22 may also include a plurality of I/O interfaces (not shown) that may be representative of Peripheral Component Interconnect (PCI) Express (PCIe™) compliant physical layer interfaces, each representing a PCIe endpoint. Accordingly, each of the links (e.g., 50A and 50n) may be PCIe links that include a number of lanes. In addition, each such I/O interface may be independently configurable by the system manager instance running on a given processor, or a service processor (not shown). As such, in one embodiment, each of the processors 30 may also include a host bridge, root ports, root complex event collectors, and root complex endpoints (all not shown) and which may correspond to a PCIe root complex.

It is noted that in various embodiments, the control unit 65 may be implemented in hardware, or firmware, or a combination. In one embodiment, the control unit 65 may be implemented as an embedded processing unit such as a microprocessor, microcontroller, or the like. Similarly, in various embodiments the AA registers 70 may be implemented as sequential logic elements such as flip-flop circuits, memory such as RAM, or any other type of suitable storage.

In one embodiment, I/O device 20 may be a virtualized device. As such, the host interface 22 may provide a shared set of resources (e.g., MAC, statistics and control, DMA channels, PIO configuration space) that allow each processor 30 to substantially transparently share the network port 25. The PIO registers unit 24 includes a number of configuration and status registers, and supports memory mapped I/O posted and non-posted transactions. Each separate link 50 goes through an independent negotiation between each processor 30 and the Host Interface 22 to determine the link width, link speed, and the specific parameters pertaining to the lanes which comprise each link.

Accordingly, in a virtualized environment, the I/O device 20 may provide a flexible number of I/O resources to a number of processes executing on the processing units 30. In one embodiment, the system manager or service processor (if present) may determine and allocate the hardware resources of the I/O device 20 among the processes during an initialization of computer system 10. The I/O device 20 may be configured to provide a measure of protection for the allocated resources such that no process may either accidentally or otherwise access the resources that have been allocated to another process.

In one embodiment, an I/O device such as the I/O device 20, for example, needs to be identified by the O/S, enumerated within the overall I/O device tree constructed by the O/S, allocated memory space, granted a unique access identification, provided interrupt mechanisms, and allocated various other resources in order to efficiently bind the service provided by the device into the overall system. Accordingly, a function is a hardware construct that includes a set of purpose-specific registers (not shown) built into an I/O device which standardizes the way a device presents its capabilities and resource requests to system software. Some of the registers such as application hardware registers, for example, may identify device capabilities and resource requests, while other registers may be used by system S/W to allocate resources such as DMA access enabling, for example, to the device. Additional registers may provide status and error management tools. A function provides this information and control capability in a standardized way independent of the service provided by the I/O device. Some I/O devices may have as few as one function, while other devices may contain many functions, and may have a function allocated to each active system image sharing the device. A base address register (BAR) may be used by a function to indicate to the O/S when it reads the BAR the amount of memory space the application requires. Should the O/S grant that request, it writes into the BAR an address which represents the starting location within the overall address map where the O/S has allocated the address space needed by the application. The application device driver affiliated with the function uses that as the base address to access resources contained within the device.

Thus, the shared resources described above and provided by the host interface 22 may be represented as functions. In one embodiment, the host interface 22 may support a number of functions, and each function may include a number of resources. The hardware resources may be divided up among the functions in an arbitrary manner. In one embodiment, each interface or I/O port may correspond to a respective function. For example, each function of the host interface 22 may provide (i.e., be associated with) one or more of the hardware resources (e.g., MAC, statistics and control, DMA channels, PIO configuration space) that allow each processor 30 to substantially transparently share the network port 25. Accordingly, each function may include one or more application hardware registers that may be accessed by an application device driver to control and configure the application hardware resources 240. As described above, each I/O interface may be independently programmed and controlled by the processing unit 30 to which it is connected.

As described above, a given function may need to be reset at any time for a variety of reasons by the OS and/or the associated process running on a processor 30. Accordingly, as shown, in FIG. 1, the host interface 22 includes a TLP processing unit 60, the control unit 65, and AA registers 70. As will be described in greater detail below in conjunction with the description of FIG. 2 and FIG. 3, the control unit 65 may be configured to respond to requests for function level resets (FLR) by processing each request within a predetermined amount of time. More particularly, the control unit 65 may be configured to reset and initialize necessary registers and hardware (e.g., configuration space registers) within the host interface 22 that is associated with the function(s) for which the reset(s) have been requested within the time allotted to an FLR. For example, the PCIe™ Specification may require that an I/O device perform an FLR so that a host is able to begin reinitializing the function within a predetermined time. However, the control unit 65 may use the AA registers 70 to communicate to the associated application device driver the availability of the application hardware associated with the function being reset so that the application device driver may begin using application hardware within the function when the associated application hardware has been reset and initialized.

Figure 2:
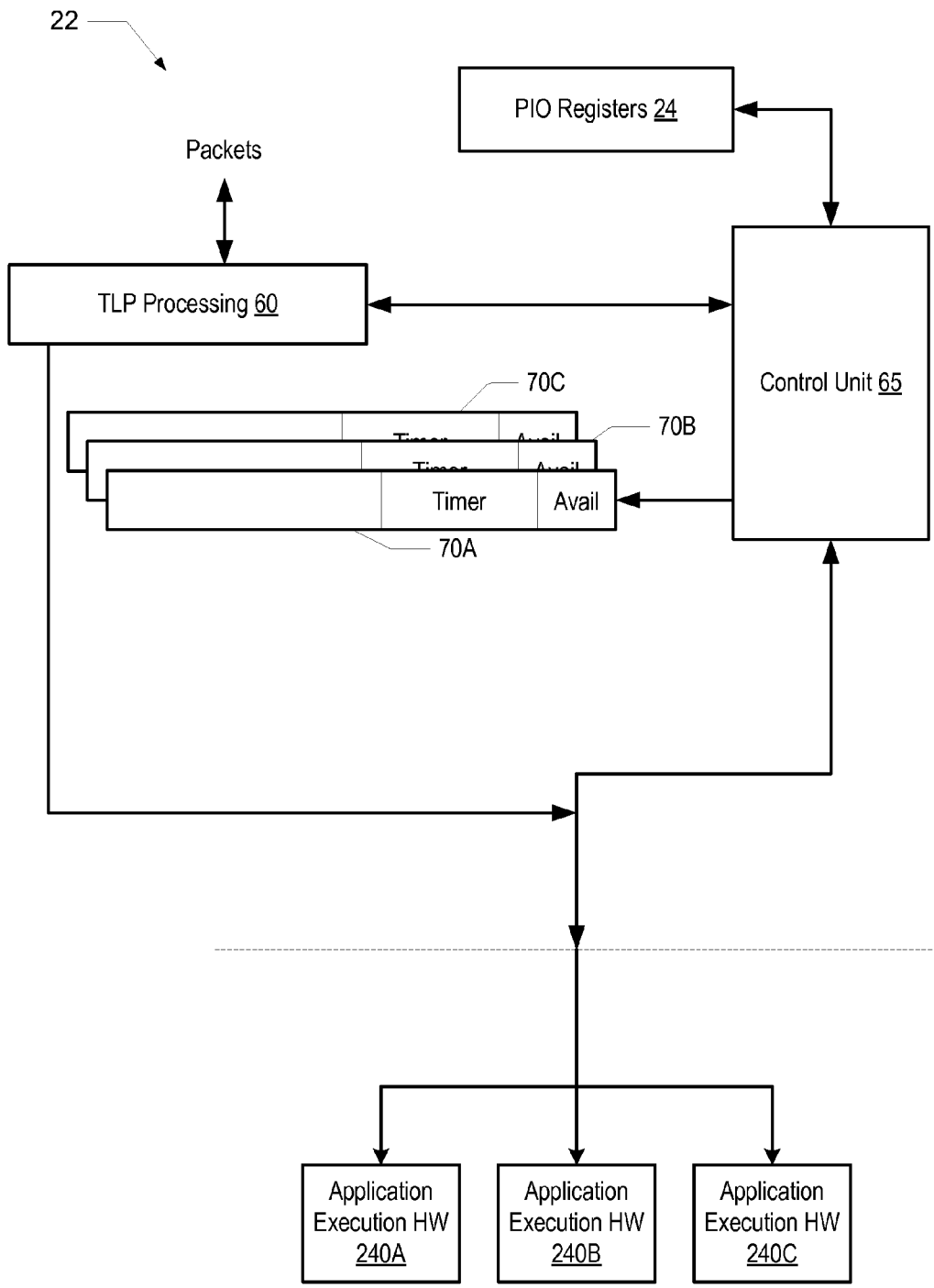
FIG. 2 is a block diagram illustrating more detailed aspects of an embodiment of the host interface unit shown in FIG. 1.

Referring to FIG. 2, a block diagram depicting more detailed aspects of one embodiment of the host interface unit of FIG. 1 is shown. Similar to the host interface 22 of FIG. 1, the host interface 22 of FIG. 2 also includes the control unit 65 that is coupled to the TLP processing unit 60 and to the AA registers 70. However, as shown in FIG. 2, the AA registers 70 are shown in more detail. More particularly, the AA registers 70 are shown as AA registers 70A through 70C. However, although only three AA registers are shown, there may be any number of functions and thus, any number of corresponding AA registers 70, one AA register 70 for each function. In the illustrated embodiment, the control unit 65 and the TLP processing unit 60 are coupled to application execution hardware, designated as 240A, 240B, and 240C.

In one embodiment, the TLP processing unit 60 may be configured to send, receive, and process incoming transaction layer packets. The TLP processing unit 60 may also be configured to disregard incoming packets targeting particular functions upon notification by the control unit 65. As mentioned above, the PIO registers 24 may include configuration and status registers that may need to be reset during an FLR.

As shown, each of the AA registers 70 includes multiple fields. More particularly, each AA register 70 includes an availability indication (e.g., a single bit, or multiple bits) which indicates whether or not the application hardware (e.g., one or more application hardware registers) associated with the function is available to the corresponding application device driver. In the illustrated embodiment, each AA register 70 includes a timer field. In one embodiment, the timer field may be an encoded value that may be updated by the control unit 65 and indicate an estimated time until the application hardware registers within the function are available. In another embodiment, the timer field may be an encoded value that indicates to the driver that the hardware is still alive when the function is not available. It is noted that in other embodiments, there may be a single availability field with a single bit, and each register may correspond to a particular function.

In one embodiment, the control unit 65 may be configured to initialize and update the AA registers 70 during FLR operations. In addition, control unit 65 may be configured to reset the configuration space registers (CSR) within PIO registers 24, and to reset specific application execution hardware as necessary. Application hardware (i.e., processing sub-blocks of application execution hardware 240A-240C) is under control of the application device driver and may include control registers and the hardware that manipulates, for example, DMA engine registers for a storage controller, cryptographic engine control registers, and the like. In addition, application execution hardware 240A-240C of FIG. 2 may include portions of the RxDP 27 and TxDP 26 units which may include specific application hardware such as classification and routing tables, for example.

More particularly, control unit 65 may be configured to change the availability indicator of a given AA register 70 to indicate that the application hardware within the corresponding function is unavailable for general use by the application device driver in response to receiving an FLR request for that function, and to change it back to available when the application hardware resources have been reset. Accordingly, the control unit 65 may perform the reset of the CSRs of PIO registers 24, as well as resetting and initializing the appropriate application execution hardware 240 associated with the function.

Figure 3:
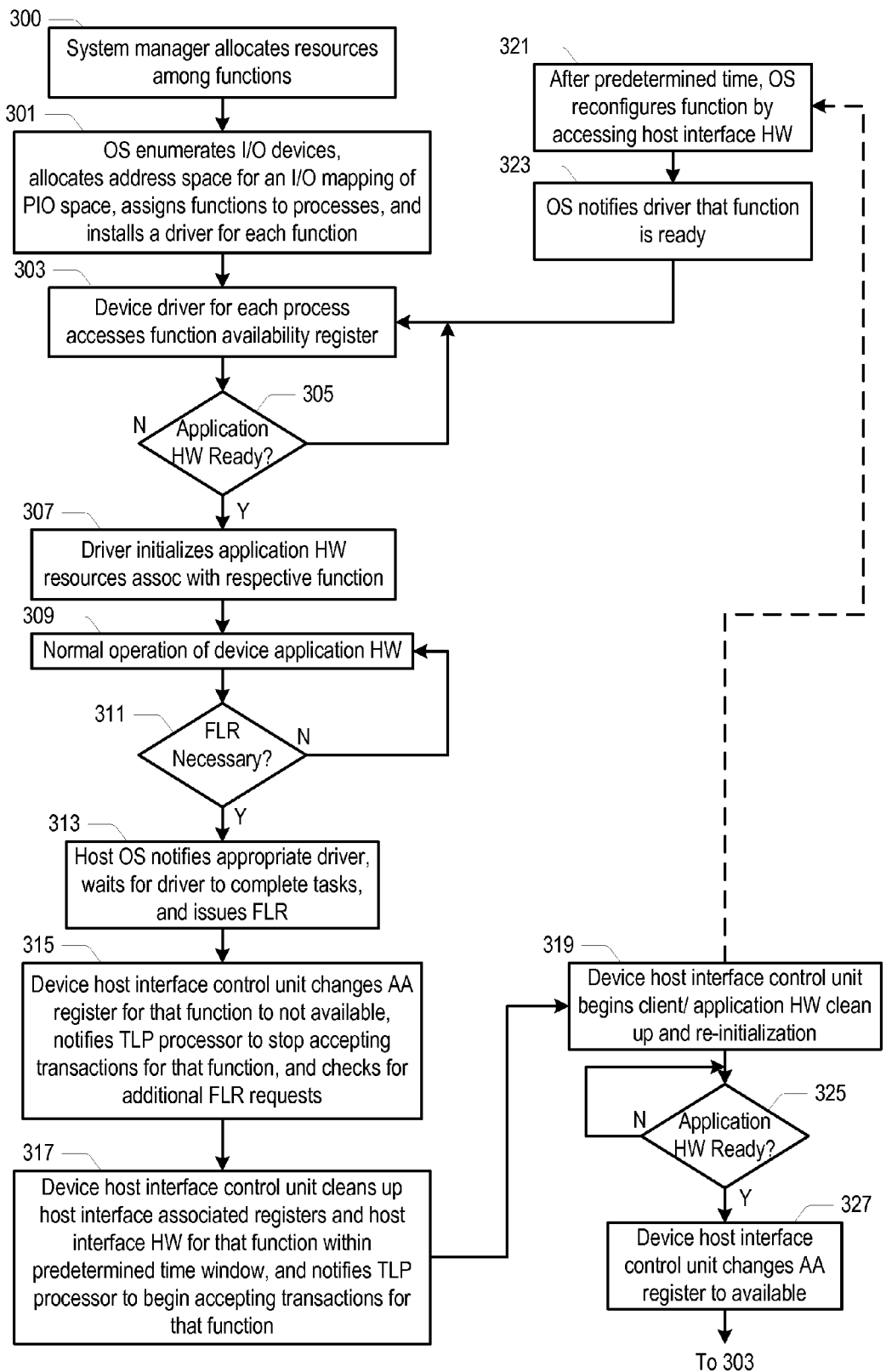
FIG. 3 is a flow diagram describing operational aspects of an embodiment of the host interface unit of the I/O device shown in FIG. 1 and FIG. 2.

FIG. 3 is a flow diagram describing operational aspects of an embodiment of the host interface unit 22 of the I/O device shown in FIG. 1 and FIG. 2. Referring collectively to FIG. 1 through FIG. 3 and beginning in block 300 of FIG. 3, during system initialization, a system manager allocates resources among the functions. In one embodiment, the system manager may be implemented as software executing on a service processor (not shown). However, it is contemplated that in other embodiments, the system manager may be implemented as software executing on another dedicated processor or processing unit that may be configured to allocate the system resources.

An operating system (OS) instance may enumerate the I/O devices in the system. In one embodiment, the enumeration process may include the OS identifying each I/O device and function in the system. The OS instance may build the I/O device tree, and allocate the address space for the functions. The OS may then assign the functions to the various processes running on the processors 30A and 30*n*. In one embodiment, each function may be identified by a unique ID. Each process may be associated with a respective application device driver. In one embodiment, the application device driver is an instance of device driver software that may be used by all the processes. The application device driver may use read and write operations through load and store operations to access the application hardware resources within the I/O device 20 (block 301).

During operation the application software may invoke the appropriate driver to access the allocated I/O resources. Accordingly, the application device driver accesses the AA register 70 that corresponds to the function which the driver is accessing (block 303). If the application hardware within the function is not available as indicated by the availability indication in the AA register 70 (block 305), then the application device driver may be configured to wait a predetermined amount of time before checking again (block 303). For example, in response to a request, the application device driver may check the availability, and if the application hardware is not available, in one embodiment, the application device driver may poll the AA register 70. In one embodiment, the application device driver may also check the timer field of the AA register 70 to ensure that the I/O device 20 is alive, and if the timer value does not change, the driver may notify the OS that there is a problem. In another embodiment, the control unit 65 may send an interrupt to the application device driver when the application hardware becomes available in a variety of ways.

If the application hardware is available (block 305), the application device driver may initialize the application execution HW resources that are associated with that function (block 307). The I/O device hardware resources that will be used by the application software are now ready and may be used and accessed by the application device driver during normal operations (block 309). This process may be repeated for each process using a different function on the I/O device 20.

As long as the OS and/or application software does not require an FLR (block 311), operation proceeds normally (block 309). If an FLR becomes necessary as described above (block 311), the host OS notifies the appropriate application device driver of the impending FLR, and waits for either the application device driver to complete the shutdown tasks, or the OS waits for a predetermined amount of time and initiates the FLR. For example, the application device driver may be in the middle of a DMA transfer. Thus, for an orderly shutdown, presumably the application device driver could take some amount of time to finish and notify the OS of the completion. However, if the application device driver or the I/O device were not responding, such as when a problem exists, the OS may initiate the FLR (block 313).

The control unit 65 may continuously scan for FLR requests during operation. Control unit 65 may concurrently service multiple FLR requests as described below. In response to receiving each FLR request, the control unit 65 changes the availability of the corresponding function (e.g., as identified by the function number) to unavailable and also changes the state of the application hardware to unavailable by, for example, performing a write to the availability field of the associated AA register 70. In addition, the control unit 65 notifies the TLP processing unit 60 to stop accepting transactions to that function (block 315). The control unit 65 may then begin resetting and initializing the host interface HW resources allocated to that function within a predetermined amount of time. More particularly, as described above, the control unit 65 may reset the CSRs and other host interface HW resources for that function, which the OS configures, within a given amount of time. For example, as described above, the PCIe specification specifies that the OS may begin reinitializing the function after 100 ms, and in some cases 1 s. When the control unit 65 finishes resetting the host interface HW resources, the control unit 65 notifies the TLP processing unit to begin accepting transactions for that function. The function is now available for system software access but the application hardware is not yet available for application device driver general access. (block 317).

The control unit 65 begins client/application execution HW reset and initialization. As described above, depending on the particular resource there may be tables of entries that may need to be parsed and individual entries that correspond to the function cleared (block 319). This resetting process may take considerably longer than the time allotted before the OS may begin reinitializing the function. Thus, the control unit 65 continues resetting the resources until the application hardware is reset (block 325). When the control unit 65 is finished resetting the application hardware 240, the control unit 65 may change the AA register 70 to indicate the application hardware is now available. Operation may proceed as described above in conjunction with the description of block 303, in which the driver may check the status/availability of the application hardware.

During the time that the control unit 65 is resetting the application execution HW 240 (block 319), if the predetermined allotted time (e.g., 100 ms) expires, the OS may begin accessing the function again. Thus, as indicated by the dashed line, after that time has elapsed the OS begins reconfiguring the function that was reset by accessing the host interface 22 (block 321). When the OS completes the reconfiguration of the resources for that function, the OS notifies the application device driver to begin using the function and its resources (block 323). Before attempting to access the application hardware within the function, the application device driver first checks its availability as described above in conjunction with the description of block 303. In addition, in one embodiment, the control unit 65 may, at predetermined intervals, update the timer field of the AA register 70 of the function being reset so that the application device driver may determine the I/O device 20 continues to operate, and/or the application device driver may determine an approximate time remaining before the FLR is completed.

It is noted that although the above embodiments have been described in the context of a multi-root system having multiple processor hierarchies. It is contemplated that in other embodiments, the host interface unit 22 and the associated control unit 65 and AA registers 70 may also be used in a single root system having a single processor 30.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An input/output (I/O) device comprising:
 a host interface configured to provide one or more I/O connections to one or more processing units via respective corresponding communication links; and
 a plurality of application hardware resources coupled to the host interface;
 wherein the host interface includes:
  a control unit;

a plurality of groups of configuration space registers, each group corresponding to one of a plurality of functions;

wherein each function includes one or more application hardware registers, wherein at least one of the application hardware registers is associated with a respective application hardware resource; and a plurality of application availability registers, each associated with a respective function and configured to indicate whether the one or more application hardware registers within the respective function are available for access by a corresponding application device software driver;

wherein in response to receiving a request for a function level reset (FLR) of a particular function, the control unit is configured to:

cause the associated application availability register to indicate that the one or more application hardware registers within the particular function is not available to the application device software driver;

reset the corresponding group of configuration space registers accessed by system software within a predetermined amount of time;

reset the associated respective application hardware resources; and update a timer field of the application availability register at predetermined intervals, wherein the timer field of the application availability register includes a value corresponding to a time until the one or more application hardware registers are available.

2. The device as recited in claim 1, wherein the host interface further includes a transaction layer packet (TLP) processing unit coupled to the control unit, wherein the control unit is further configured to notify the TLP processing unit to stop accepting transactions directed to the particular function while the control unit is in the process of resetting the corresponding group of configuration space registers.

3. The device as recited in claim 1, wherein the control unit is further configured to notify the TLP processing unit to begin accepting transactions directed to the particular function once the control unit completes the reset of the corresponding group of configuration space registers.

4. The device as recited in claim 1, wherein the control unit is configured to cause the associated application availability register to indicate that the one or more application hardware registers within the particular function are available to the corresponding application device software driver once the control unit completes the reset of the associated application hardware resources.

5. The device as recited in claim 4, wherein the predetermined amount of time corresponds to a time period after which an operating system of a given one of the processing units that requested the FLR is allowed to access the group of configuration space registers corresponding to the particular function.

6. The device as recited in claim 1, wherein the control unit is configured to concurrently process a plurality of FLR requests.

7. A system comprising:

one or more processing units each configured to execute operating system software and one or more application device software drivers; and an input/output (I/O) device coupled to each of the one or more processing units via a respective communication link;

wherein the I/O device includes:

a plurality of application hardware resources; and a host interface coupled to the plurality of application hardware resources, wherein the host interface includes:

a control unit;

a plurality of groups of configuration space registers, each group corresponding to one of a plurality of functions;

wherein each function includes one or more application hardware registers, wherein at least one of the application hardware registers is associated with a respective application hardware resource; and a plurality of application availability registers, each associated with a respective function and configured to indicate whether the one or more application hardware registers within the respective function are available for access by a corresponding application device software driver;

wherein in response to receiving a request for a function level reset (FLR) of a particular function, the control unit is configured to:

cause the associated application availability register to indicate that the one or more application hardware registers within the particular function is not available to the corresponding application device driver;

reset the corresponding group of configuration space registers accessed by system software within a predetermined amount of time;

reset the associated application hardware resources; and update a timer field of the application availability register at predetermined intervals, wherein the timer field includes a value corresponding to a time until the one or more application hardware registers are available.

8. The system as recited in claim 7, wherein the host interface further includes a transaction layer packet (TLP) processing unit coupled to the control unit, wherein the control unit is further configured to notify the TLP processing unit to stop accepting transactions directed to the particular function while the control unit is in the process of resetting the corresponding group of configuration space registers.

9. The system as recited in claim 7, wherein the control unit is further configured to notify the TLP processing unit to begin accepting transactions directed to the particular function once the control unit completes the reset of the corresponding group of configuration space registers.

10. The system as recited in claim 7, wherein the control unit is configured to cause the associated application availability register to indicate that the one or more application hardware registers within the particular function are available to the corresponding application device software driver once the control unit completes the reset of the associated application hardware resources.

11. The system as recited in claim 7, wherein the predetermined amount of time corresponds to a time period after which an operating system of a given one the processing units that requested the FLR is allowed to access the corresponding group of configuration space registers.

12. The system as recited in claim 7, wherein the control unit is further configured to reset the associated application hardware resources after resetting the corresponding group of configuration space registers.

13. A method comprising:

providing an input/output (I/O) device having a host interface including a plurality of groups of configuration space registers accessible by system software, each group corresponding to one of a plurality of functions;

wherein each function includes one or more application hardware registers, wherein at least one of the application hardware registers is associated with a respective application hardware resource;

providing a plurality of application availability registers, each associated with a respective function and indicating whether the one or more application hardware registers within the respective function are available for access by a corresponding application device software driver;

wherein in response to receiving a request for a function level reset (FLR) of a particular function, processing the FLR request by:

causing the associated application availability register to indicate that the one or more application hardware registers within the particular function is not available to the application device software driver;

resetting the corresponding group of configuration space registers within a predetermined amount of time;

resetting the associated application hardware resources; and updating a timer field of the application availability register at predetermined intervals, wherein the timer field includes a value corresponding to a time until the one or more application hardware registers are available.

14. The method as recited in claim 13, further comprising notifying the host interface to stop accepting transactions directed to the particular function while resetting the corresponding group of configuration space registers.

15. The method as recited in claim 13, further comprising notifying the host interface to begin accepting transactions directed to the particular function when the resetting of the corresponding group of configuration space registers is complete.

16. The method as recited in claim 13, further comprising causing the associated application availability register to indicate that the one or more application hardware registers within the particular function is available to the corresponding application device software driver once the resetting of the associated application hardware resources is complete.

17. The method as recited in claim 13, wherein the predetermined amount of time corresponds to a time period after which an operating system of a given processing unit that requested the FLR is allowed to access the corresponding group of configuration space registers.

18. The method as recited in claim 13, further comprising concurrently processing a plurality of FLR requests.

* * * * *